May 7, 1968
J. C. BOONSHAFT ET AL
3,381,931
FAST RELEASE VALVE
Filed Sept. 30, 1966
2 Sheets-Sheet 1
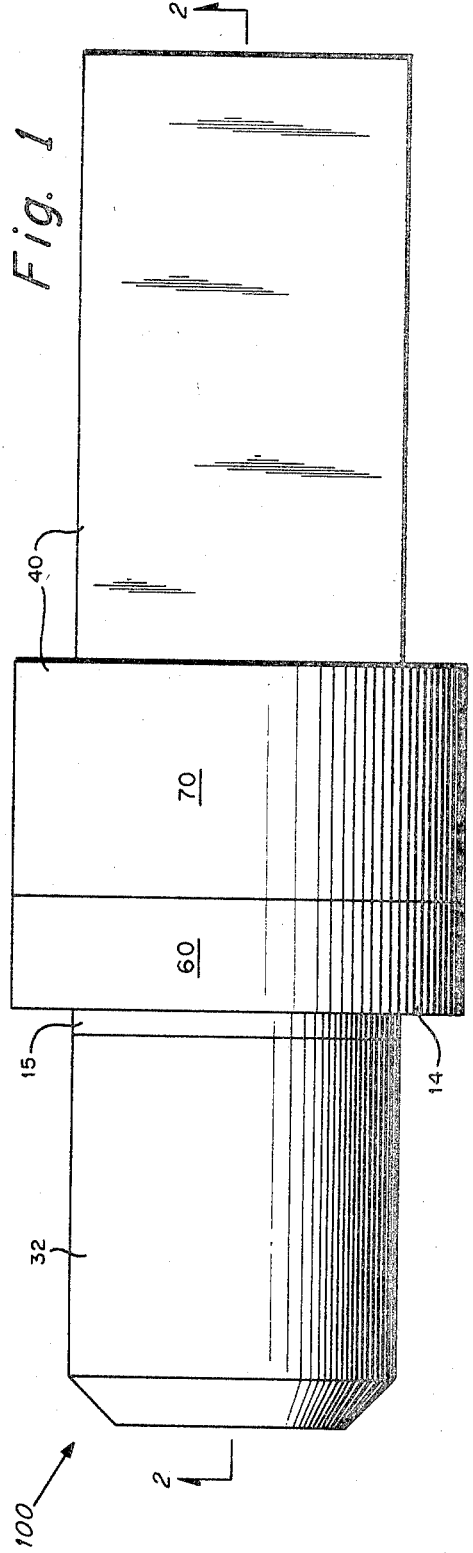
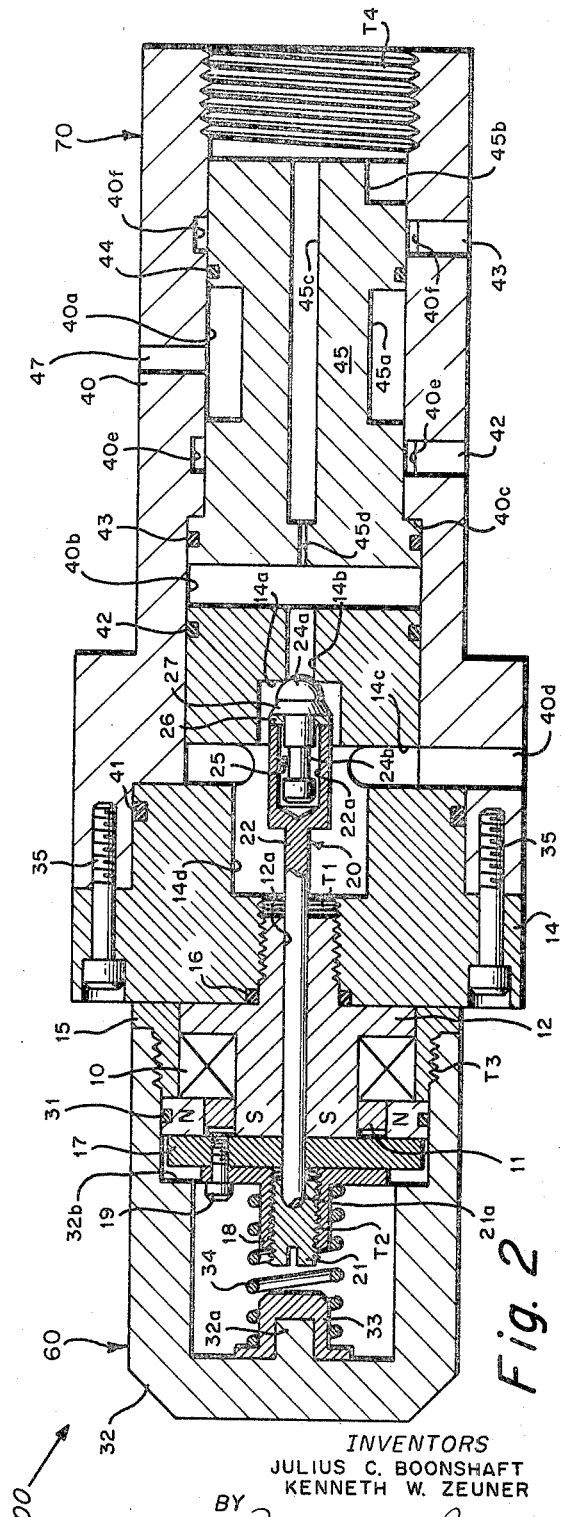
INVENTORS
JULIUS C. BOONSHAFT
KENNETH W. ZEUNER
BY *Maleson and Ratner*
ATTORNEYS May 7, 1968   J. C. BOONSHAFT ET AL   3,381,931
FAST RELEASE VALVE
Filed Sept. 30, 1966   2 Sheets-Sheet 2

INVENTORS
JULIUS C. BOONSHAFT
KENNETH W. ZEUNER
BY
*Maleson and Ratner*
ATTORNEYS United States Patent Office 3,381,931
Patented May 7, 1968

3,381,931
FAST RELEASE VALVE
Julius C. Boonshaft, Huntingdon Valley, and Kenneth W. Zeuner, Newtown, Pa., assignors to Weston Instruments, Inc., Newark, N.J., a corporation of Delaware
Filed Sept. 30, 1966, Ser. No. 583,233
9 Claims. (Cl. 251—30)

This invention relates to a hydraulic valve. More particularly, it relates to a hydraulic valve serving as a pilot valve for a main hydraulic valve.

More particularly, this invention relates to a pilot hydraulic valve provided with a particular type of electromagnet, and capable of very fast release itself and capable of inducing a very fast release in the main hydraulic valve which it controls.

This invention relates to a fast release hydraulic valve utilizing an electromagnet known as a latching, holding, or wafer solenoid, and in which the potential energy in the hydraulic fluid present in the valve is an important factor in the release of the valve, and in which after release, the said potential energy decreases and other means may act to reset said valve.

In general, particularly favorable applications of this valve lie in the fields of high speed operation of hydraulic equipment and high speed on-command safety control. More specifically, desirable applications in the field of materials testing include high speed strain rate testing, and high speed shutdown of fatigue or test machines following specimens or machine failure. In the field of acceleration or shock testing, these valves find application for high speed rotary acceleration, in linear shock machines, and in high onset rate devices. In wind tunnel facilities, the valves find applications in high speed model inspection, high speed safety shutdown for venter in-line control valves, and high speed load removal from flexible walls. In all such applications, the valves provide extremely fast release actuation with remote resetting. It is understood that these applications and functions are typical and by no means limiting or exclusive.

In the field of art where relatively high pressures, such as 3,000 p.s.i. and relatively high powers such as 400 H.P. as non-limiting examples are encountered, the typical expedient has been to utilize valves with actuating solenoids in which the power of the solenoid as a "brute force" device is largely relied on. Due to inherent electrical and magnetic build-up and decay lags, the inertia of relatively heavy moving parts, and the requirement of relatively long travels, the state of the art has recognized time limitations in the action of such valves. Other expedients have included valves of the collapsing link type, in which the speed of operation is faster than that of the actuating solenoid type, but in which the total elapsed time from zero time, that is, the time when the relief command is given, is still relatively long, and is not reliably reproducible. The herein disclosed valve provides a reproducibly reliable relatively very short total elapsed time from the command to the release. Considering electrical, magnetic, inertia, friction, and other effects, the order of magnitude of the elapsed time from the command to the release of the pilot valve may be as little as 2–4 milliseconds.

It is an object of this invention to provide a hydraulic valve.

It is an object of this invention to provide a pilot hydraulic valve having a fast release on command and being remotely resettable.

It is an object of this invention to provide a pilot hydraulic valve.

It is yet another object of this invention to provide a fast release pilot hydraulic valve including a wafer solenoid, utilizing the potential energy in the hydraulic fluid present in the valve as a significant factor in the release of the valve, and in which after release, said potential energy decreases to a relatively very low condition, and other means act to remotely reset said valve on command against said potential energy of said hydraulic fluid.

Other aims and objects of this invention are made apparent in the following specification and claims:

The invention is best understood in connection with the accompanying drawings in which like reference numerals refer to like parts and in which:

FIGURE 1 is a side external view of the pilot valve connected to a main valve,

FIGURE 2 is a cross-sectional view taken along the line 2—2 of FIGURE 1,

Figure 3:
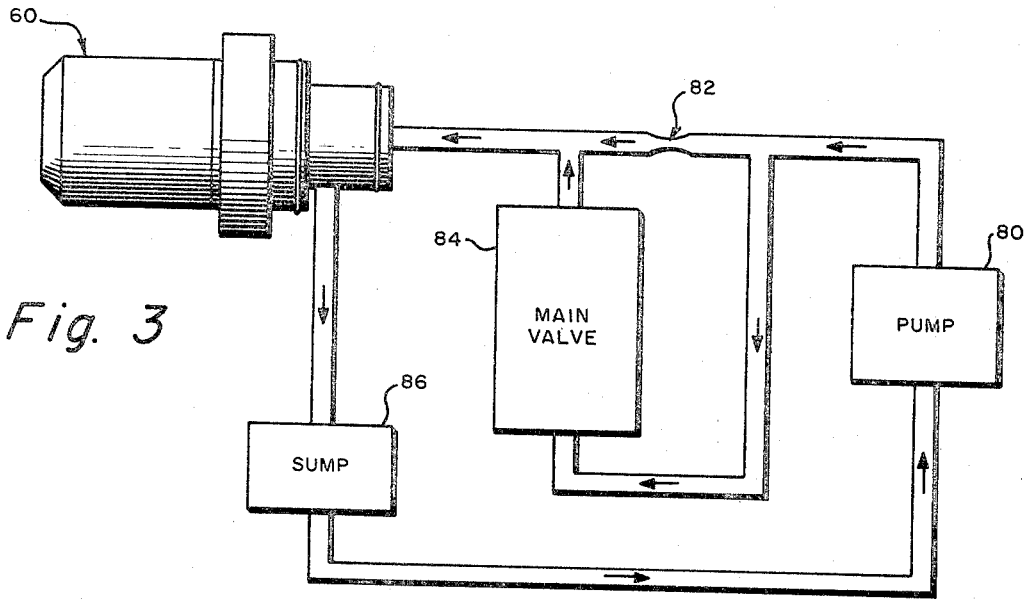
FIGURE 3 is a schematic view of the pilot valve and its connections to the main valve and other hydraulic system members.

The detailed construction of a preferred embodiment of the invention can best be initially explained in connection with FIGURE 2, in which the combined pilot valve-main valve unit is generally designated 100. The pilot valve element is generally designated 60 and the main valve element is generally designated 70. The pilot valve 60 is described in detail first.

A removable cover 32 is provided. This cover is attachable by means of screw threads T3 to the solenoid shell 15. This cover is generally cup-shaped and hollow. At the inner closed end thereof cover 32 includes a retainer stud 32a on which spring retainer 33 is positioned. On and around the spring retainer 33, a spring 34 is provided and seated. The characteristics of this spring are described in more detail below. At the end of the spring remote from the end which is seated on retainer 33, the spring is provided with a wafer lock nut 18, which has a neck portion fitting inside the spring. A pushrod adjusting screw 21 is provided inside this neck portion of the wafer lock nut 18, and is adjustable with relation thereto by means of threads T2. As shown, a slot is provided in the pushrod adjusting screw 21, and it is appreciated that when cover 32 is removed, the pushrod adjusting screw 21 can be adjusted relative to the wafer lock nut 18 by inserting and turning a screwdriver blade in the slot.

The wafer lock nut 18 is attached to the wafer or armature plate 17 by means of a bolt 19. The drawing shows a single bolt 19, which is the only bolt shown by that particular section taken in the drawing, but it is understood that preferably there would be a plurality of such bolts, preferably spaced at equal distances around the center of the wafer lock nut 18. The means by which the wafer 17 is attached to the wafer lock nut 18 is not critical.

The wafer or armature plate 17 is a soft steel, generally circular, generally flat disc made of well-known material suitable for use as an armature in a solenoid. The view in FIGURE 2 is taken across a diameter of this circular disc.

An electromagnet 12 is provided. In the preferred embodiment as used, the magnetic portions of the electromagnet are made of several connected pieces of soft steel of a type suitable and well-known for such applications. An annulus or ring, marked N in the drawing, is provided. Adjacent to it to the right, as shown, is the solenoid shell 15, also made of soft steel, since it forms part of the electromagnet. A symmetrical center section, having the cross-section shown in FIGURE 2, and also being circular in cross-section in a plane perpendicular to the drawing, is marked S. Together these pieces make up an electromagnet having north and south poles as indicated by the reference letters. A spacer ring 11 is provided between the annulus N and the magnet part S. This spacer ring is of a non-magnetic material, preferably brass. It is understood that the view in FIGURE 2 is taken along one diameter of the circular magnet 12, and a view along any other diameter would be substantially the same.

A coil 10 is provided around that part of the magnet marked S, as shown. The coil 10 is electrically connected to external leads (not shown) in a conventional manner, so that when current flows through the coil, the magnet 12 is energized and the wafer 17 is attracted and held against the left surface of the magnet.

Figure 4:
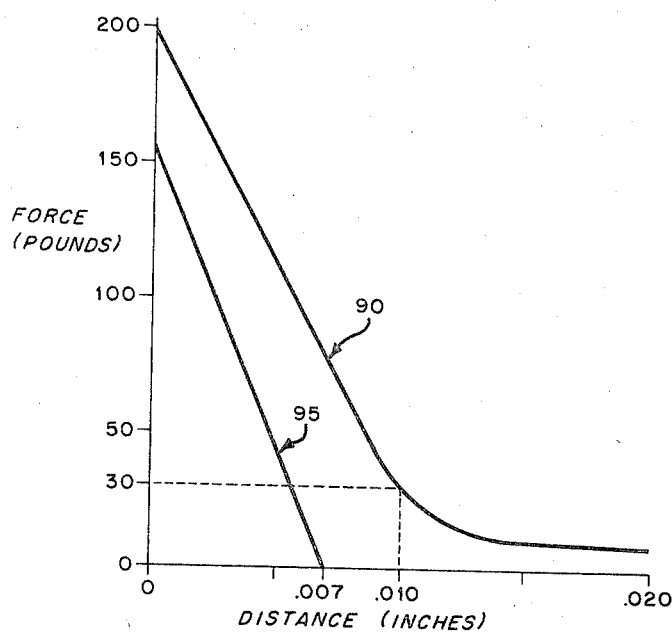
FIGURE 4 is a diagram showing the idealized and approximate force-distance relationships between the wafer solenoid and the Belleville spring.

The magnet 12 may essentially be described as the solid of revolution produced by rotating a horseshoe magnet around an axis parallel to the arms of the magnet, said axis running through a point on a line, said line passing through both arms of said magnet, said point being outside the arms of said magnet. This type of magnet is characterized by having the lines of magnetic flux relatively closely constrained between the north and south poles, so that the holding force or magnetic attraction drops off very rapidly as the distance from the face of the poles increases. In FIGURE 4, 90 is the curve showing the electromagnet holding force as a function of distance from the face of the magnet when the coil is energized. This curve is idealized, and is presented to show that the drop of force is very rapid with a small movement away from the face of the magnet. The force and distance measurements given in FIGURE 4 are representative of a preferred embodiment.

The coil operates on 28 volts D.C., draws one ampere, and has a resistence of 35 ohms. The diameter of the wafer, and hence the diameter of the magnet, is preferably two inches, and the remaining portions of the pilot valve 60 are preferably in dimensional proportion to this dimension, as shown in FIGURE 2. A unit including the magnet 12, the coil 10, and the wafer 17 is sold, described as a wafer solenoid, by Koontz-Wagner Electric Company, Inc., South Bend, Ind. and is identified as part EX10408–2.

The annulus marked N is provided with a groove to accommodate an O-ring 31. The wafer and the wafer lock nut have limited motion within cover 32. As shown, the wafer 17 is at its extreme righthand position against the face of the magnet 12. When the coil 10 is de-energized, and the valve is released, as explained below, the wafer 17 moves to the left until it hits shoulder 32b.

The electromagnet 12 is mounted on a pilot block 14, preferably of aluminum. As shown, it is affixed by having a threaded central extension to the right which screws into a matching hole in the pilot block, with threads T1. An O-ring 16 is provided around the center section S of magnet 12 where the center section is extended into the pilot block 14.

The magnet 12 is provided with a bore 12a through the center thereof. This bore acts as a sliding-fit guide for a valve stem generally designated 20. The valve stem 20 includes an elongated pushrod 22 preferably circular in transverse cross-section. The left end of the pushrod 22 fits into a rod receiver 21a in wafer adjusting screw 21.

The valve stem 20 has an expanded hollow portion at the right hand end which may be termed a plunger receiver 22a.

The pilot block 14 is provided with a hollow central chamber 14d which accommodates the plunger receiver and its limited left-right motion. The plunger may be described as comprising a dumb-bell shaped body 24b, connected to a hemispherical plunger head 24a.

The dumb-bell shaped body portion 24b is positioned loosely within the plunger receiver 22a. The plunger head 24a is directly connected to or is an integral part of the plunger body 24b. That part of the plunger connecting the plunger head 24a and the plunger body 24b is hidden in the drawing behind the disk spring or Belleville spring 27 which fits around the plunger as a loose collar. The righthand edge of the Belleville spring 27 bears on a shoulder behind the curved surface of the plunger head 24a. The lefthand edge of the Belleville spring 27 bears on a guide washer 26 which fits over the end of the plunger receiver 22a.

The Belleville or disk spring 27 is a known type of spring which looks like a slightly conical washer. It is characterized by having a very short travel and a very high rate. A spring suitable in this preferred embodiment has a force of 160 pounds in 0.08 inch travel. The coil spring 34, previously described, has a relatively low rate and long travel. In the preferred embodiment, when spring 34 is in its compressed condition, it exerts a force of about 2–5 pounds. From their functions in the valve, the Belleville spring 27 may be described as a clearance take-up spring and trigger-bias or load dividing spring, and the spring 34 may be described as a friction-overcoming spring and a return spring.

The guide washer 26 and the plunger head 24a are made of a hard tool steel such as the type known as Elastif, which has a hardness of the order of magnitude of about Rockwell 70. The Belleville spring is of course of spring steel. The reasons for the desirability of the hard steel surfaces against which the Belleville spring bears is that during repeated operation, the Belleville spring tends to gouge the surfaces on which its edges bear, and thus change the desirable dimensions.

The plunger head 24a seats on a valve seat 14a in the block 14.

The plunger body 24b is loose in the plunger receiver 22a so that as the valve stem moves right and the plunger head seats on the valve seat, there is enough play to insure a firm and aligned seating. The rollpin 25 is a pin or set-screw that extends through the plunger receiver 22a transverse to the long axis of the valve stem, and fits between the enlarged portions of the dumb-bell shaped plunger body 24b. It thus acts as a retainer to hold the plunger within the plunger receiver while permitting it the desirable degree of free motion.

The central chamber 14d is extended to form an annulus 14c around the plunger receiver, and this in turn leads to a drain port 40e.

The pilot block 14 is further provided with a channel 14b leading to the valve seat 14a. High pressure hydraulic fluid is admitted to the interior of the valve through this channel 14b. The foregoing description has been of the pilot valve, and only the addition of a reduced aperture in the line supplying hydraulic fluid to channel 14b is required to make the device function as set forth herein.

In the embodiment shown in FIGURE 2, high pressure hydraulic fluid is admitted from the righthand side of the drawing through a line (not shown) coupled at threads T4, and flows through main valve channel 45c and thence through reduced aperture 45d. The hydraulic fluid then enters the main valve left chamber 40b, which connects to the channel 14b. An operative complete pilot valve and the necessary reduced aperture that coacts with it to form an operative device has been described above. The remaining right-hand portion of FIGURE 2 not yet described in detail is that of the main valve whose action is to be triggered by the pilot valve. It is understood that the particular main valve shown in detail in FIGURE 2 is merely a representative or typical embodiment of a piece of equipment that can be triggered by the pilot valve, and it also is apparent that the main valve as shown, or other piece of equipment to be triggered, may be close-coupled and made unitary with the pilot valve, as shown, or may be remote from the pilot valve. Before describing in detail the operation of the pilot valve, the structural details of the representative main valve 70 are described below.

The main valve 70 comprises a shell or casing 40. This shell is coupled to the pilot valve 60 by means of bolts 35. O-rings 41 and 42 provide seals at desirable points between the main valve and the pilot valve as shown.

A spool 45 is provided with a close sliding fit within the shell 40. The spool 45 preferably has a generally circular cross-section in a plane transverse to the plane of the drawing.

The shell 40 is provided with a first annulus 40e which is a circular groove on the inner surface 40a of the shell 40, and a second annulus which is a second groove on the inner surface of the shell 40, these grooves extending completely around the spool 45. A first port 42 communicates with first annulus 40e and a second port 43 communicates with second annulus 40f. A reduced section 45a is provided in spool 45 as shown, substantially near the mid-point of the long axis of the spool, and circumferentially around the spool. This reduced section 45a communicates with third port 47. A second reduced spool section 45b is provided at the righthand end of the spool, as shown.

O-rings 43 and 44 provide sealing sliding fits of the spool 45 against the shell inner surface 40a.

In the position as shown, the main valve has its ports 42 and 43 blocked at the valve, and while port 47 communicates to reduced section 45a, it also is hydraulically blocked. When the spool moves to the left to the extent that it traverses and fills the main valve left chamber 40b, first port 42 communicates via first annulus 40e and reduced section 45a with third port 47. Also, second port 43 communicates via second annulus 40f and second reduced section 45e with main hydraulic pressure fluid line coupled at threads T4. For the purposes of this patent, it is not important exactly what functions in a larger hydraulic system are performed by the operation of the main valve as described; it is only important that changes are induced in such a larger system. For example, a typical function is that when the spool 45 moves from its righthand position to its lefthand position, a piece of machinery such as a fatigue testing device, is shut down and braked.

It is apparent that in all positions of main valve 17, hydraulic fluid pressure is available through main valve channel 45c reduced aperture 45d.

The mode of operation of the pilot valve and certain further details are explained below. In the position shown in FIGURE 2, the pilot valve 60 is in the non-released state with the wafer solenoid being energized. Wafer 17 is thus held tightly against the face of the magnet with a force of approximately 200 pounds due to the magnet. The additional relatively small force of spring 34 is not a significant contribution to the non-release or closed state. The plunger head 24a is seated firmly against the valve seat 14a.

The Belleville spring 27 has two functions. One function is to enable the device to maintain a zero gap between the wafer and magnet on one hand and the plunger head and valve seat on the other hand, at the same time. The pushrod adjusting screw 21 is thus adjusted so that the effective overall length of the valve stem is slightly greater than the distance available within the valve, and therefore as the pushrod moves to the right, the plunger head contacts the valve seat before the wafer is fully drawn up against the magnet. This insures a firm seating of the valve.

A second important function of the Belleville spring 27 is that as it compresses it provides a force opposing the holding force of the wafer solenoid. The Belleville spring is chosen so that even at its maximum compression in the closed position of the pilot valve, its force together with the hydraulic force exerted on the surface of plunger head 24a is less then the holding force of the wafer solenoid where there is a zero gap between the wafer and the magnet.

For purposes of illustration, the force-distance relationship of the Belleville spring is shown by curve 95 in FIGURE 4. In this figure, the maximum force exerted by the Belleville spring where it is under maximum compression, and there is a zero gap at both the plunger-valve seat and wafer-magnet, is 160 pounds. In practice, in the preferred embodiment, the Belleville spring would not ordinarily be fully compressed and would not exert this full force. It is apparent that as long as the force of the Belleville spring and the force of the hydraulic fluid on the plunger head do not exceed the holding power of the solenoid, the pilot valve remains closed. It is also apparent that careful adjustment of the pushrod adjustment screw 21 varies the compression and force of the Belleville spring so that the total forces opposing the holding force of the solenoid can be made to approach the holding force of the solenoid so that though the valve remains closed, it is made very sensitive to a slight decrease in the solenoid holding force.

To open the valve, the current to the solenoid is cut off and the coil 10 de-energized. The magnetic field starts to decay, the decay rate being on the order of magnitude of 1–2 milliseconds. As soon as the solenoid holding force is less than the sum of the opposing forces as described above, the wafer, the pushrod and their connected moving parts start to move to the left. A second important effect in the quick operation of the valve is the very rapid fall in the holding force of the field with distance, due to the structure of the magnet, as has been described. Thus, the decay of the field plus its decrease due to increased distance combine to cause a very rapid decrease in force. The wafer 17 moves against shoulder 32, and the plunger head 24a is fully withdrawn from valve seat 14a. Because of the use of this type of wafer solenoid which can utilize much lighter armature and other moving parts than do actuating "brute force" solenoids, the inertial effects are also reduced, and it has been found that the total time for full opening from command may be on the order of magnitude of 2–4 milliseconds.

Main valve left chamber 40b is now opened to drain port 40d, and the high pressure hydraulic fluid drains off. The flow of fluid through channel 45c to refill the chamber 40b is restricted by reduced aperture 45d. The aperture may be .03 inch in diameter and the flow rate may be about 1 gallon per minute. Thus, the pressure in chamber 40b typically rapidly falls from 3,000 p.s.i. to about 20 p.s.i. It is appreciated that the full high pressure still exists on the righthand side of spool 45, and thus the spool 45 shifts to the left, overcoming whatever biasing device, such as a spring, had kept it in the righthand position when the forces on each end were equal.

The pressure against plunger head 24a having dropped, due to the drop in pressure in chamber 40b, as described, and thus in channel 14b, and the Belleville spring 27 being unconstrained and thus exerting no force, the spring 34 pushes the wafer back toward the right, overcoming friction, and bringing the wafer into the field of the solenoid magnet when that field is re-energized. Hydraulic fluid continues to drain.

When the field is re-energized, the wafer 17 is pulled up against the face of the magnet, with its holding force being greater than the opposing force of the Belleville spring 27 at all distances from zero gap. As the plunger head 24a starts to seat and then fully seats, the pressure due to the hydraulic fluid flowing through aperture 45d builds up to the high pressure again, but at a rate much slower than the action of closing a pilot valve. It is apparent that when the pressure has built up in chamber 40b, the main valve returns to its former position.

In FIGURE 2, it is seen that the pilot valve, the main valve, and the reduced aperture are all in a single unit, and furthermore that there is one main supply of hydraulic fluid pressure which operates both valves and also the external hydraulic system being controlled.

In FIGURE 3, a slightly modified embodiment is shown. The pilot valve 60 is a separate unit. The reduced aperture 82 is separately inserted in a hydraulic line, and main valve 84 is a separate unit. Pump 80 supplies hydraulic fluid for the control of both the main valve and the pilot valve. The drain from drain port 40d leads to sump 86 and is thence returned to the pump. It will be appreciated that FIGURE 3 is a schematized showing of the same functional inter-relationships as are present in the embodiment of FIGURE 2. The only difference in function in FIGURE 3 is that there is no showing in the figure that the external hydraulic lines being controlled by the main valve are actually supplied with hydraulic fluid from the same source as are the controls of the pilot and main valves.

The scope of this invention is to be determined by the appended claims and not limited to the accompanying description and drawings which are illustrative.

We claim:

1. A fast release hydraulic valve comprising a wafer solenoid having a certain holding force when closed, a valve stem connected to and movable by said wafer solenoid, a plunger head connected to said valve stem, a valve seat against which said plunger head selectively seats, a trigger bias spring between said plunger head and said valve stem, a channel from said valve seat communicating to a source of hydraulic fluid under pressure, said valve being closed when said wafer solenoid is energized and closed, said trigger-biased spring being at least partially compressed when said valve is closed, the sum of the force of said trigger bias spring being less than said holding force of said wafer solenoid when said wafer solenoid is closed.

2. A fast release hydraulic valve as set forth in claim 1, wherein a reduced aperture is provided between said source of hydraulic pressure and said channel to said valve seat and wherein a drain port is provided in said valve, said drain port being isolated from said channel when said valve is closed, and communicating with said channel when said valve is open.

3. A fast release hydraulic valve as set forth in claim 1, wherein said valve stem has a plunger receiver at one end thereof, said plunger head is affixed to a plunger body, said plunger body is loosely contained within said plunger receiver, and said trigger bias spring is positioned between said plunger head and said plunger receiver.

4. A fast release hydraulic valve as set forth in claim 3 wherein a return spring is provided, said solenoid comprises an electromagnet and a wafer, said return spring bears against said wafer and said return spring is biased to urge said wafer against said electromagnet, the force of said return spring being of a low order of magnitude no greater than is sufficient to overcome the internal friction of said valve and to urge said wafer close enough to said electromagnet so that said wafer is within the field of said electromagnet and is drawn against said electromagnet when said electromagnet is energized.

5. A fast release hydraulic valve as set forth in claim 4 wherein a cover is provided over said wafer solenoid, said return spring is a helical spring positioned between the inside of said cover and said wafer, and said trigger bias spring is a Belleville spring.

6. A fast release hydraulic valve as set forth in claim 5 wherein means are provided adjacent said wafer to selectively adjust the distance between said plunger receiver and said wafer, said distance being selected so that said plunger head contacts said valve seat before said wafer contacts said electromagnet.

7. A fast release hydraulic valve as set forth in claim 6 wherein said adjustment means comprises a wafer lock nut affixed to said wafer, said lock nut having an internal thread, and a threaded adjustment screw within said lock nut, said adjusting screw bearing against said valve stem.

8. A combination of a fast release hydraulic pilot valve and a main valve to be controlled thereby, said pilot valve and said main valve being coupled together, said pilot valve comprising a wafer solenoid having a certain holding force when closed, a valve stem connected to and movable by said wafer solenoid, a plunger head connected to said valve stem, a valve seat against which said plunger head selectively seats, a trigger bias spring between said plunger head and said valve stem, a channel from said valve seat communicating to a source of hydraulic fluid under pressure, said valve being closed when said wafer solenoid is energized and closed, said trigger-biased spring being at least partially compressed when said valve is closed, the sum of the force of said hydraulic fluid against said plunger head plus the force of said trigger bias spring being less than said holding force of said wafer solenoid when said wafer solenoid is closed, said main valve including a chamber communicating with said channel and a main valve channel having a reduced aperture therein connecting said chamber to said hydraulic fluid pressure source, and a drain port partly comprised by said pilot valve and said main valve, said drain port communicating to said pilot valve and being isolated from said channel when said valve is closed and communicating with said channel when said valve is open.

9. The combination of a fast release hydraulic valve and a main valve to be controlled thereby, a source of hydraulic fluid under pressure, a reduced aperture in an hydraulic line, said source communicating with said line on one side of said aperture and said main valve and said pilot valve communicating with said line on the other side of said aperture, said pilot valve comprising a wafer solenoid having a certain holding force when closed, a valve stem connected to and movable by said wafer solenoid, a plunger head connected to said valve stem, a valve seat against which said plunger head selectively seats, a trigger bias spring between said plunger head and said valve stem, a channel from said valve seat communicating to a source of hydraulic fluid under pressure, said valve being closed when said wafer solenoid is energized and closed, said trigger-biased spring being at least partially compressed when said valve is closed, the sum of the force of said hydraulic fluid against said plunger head plus the force of said trigger bias spring being less than said holding force of said wafer solenoid when said wafer solenoid is closed, and a drain port, said drain port being isolated from said channel when said valve is closed and communicating with said channel when said valve is open, and a sump in a second hydraulic line between said drain port and said source.

References Cited

UNITED STATES PATENTS

| 3,250,294 | 5/1966 | Hipple | 251—30 |
| 3,357,676 | 12/1967 | Boonshaft | 251—30 |

FOREIGN PATENTS

| 1,100,189 | 3/1955 | France. | |

A. ROSENTHAL, *Primary Examiner.*

Disclaimer and Dedication 3,381,931.—*Julius C. Boonshaft*, Huntingdon Valley, and *Kenneth W. Zeuner*, Newton, Pa. FAST RELEASE VALVE. Patent dated May 7, 1968. Disclaimer and dedication filed Feb. 4, 1970, by the assignee, *Weston Instruments, Inc.*

Hereby enters this disclaimer to the entire remaining term of said patent and dedicates the patent to the Public.

[*Official Gazette May 26, 1970.*]